United States Patent
Wu

(10) Patent No.: US 9,856,633 B1
(45) Date of Patent: Jan. 2, 2018

(54) ANTI-FREEZE FAUCET

(71) Applicant: Cheng-Hsuan Wu, Lugang Township, Changhua County (TW)

(72) Inventor: Cheng-Hsuan Wu, Lugang Township, Changhua County (TW)

( * ) Notice: Subject to any disclaimer, the term of this patent is extended or adjusted under 35 U.S.C. 154(b) by 0 days.

(21) Appl. No.: 15/249,517

(22) Filed: Aug. 29, 2016

(51) Int. Cl.
| | |
|---|---|
| *E03C 1/10* | (2006.01) |
| *E03B 9/02* | (2006.01) |
| *E03B 7/12* | (2006.01) |
| *F16K 11/074* | (2006.01) |
| *F16K 31/60* | (2006.01) |

(52) U.S. Cl.
CPC ............... *E03B 9/027* (2013.01); *E03B 7/12* (2013.01); *F16K 11/074* (2013.01); *F16K 31/605* (2013.01)

(58) Field of Classification Search
CPC ... E03B 9/027; E03B 7/10; E03B 9/14; E03B 7/12; F16K 11/074; F16K 31/605
See application file for complete search history.

(56) References Cited

U.S. PATENT DOCUMENTS

| 2,952,270 | A | * | 9/1960 | Fulton | E03B 7/10 137/360 |
|---|---|---|---|---|---|
| 5,158,105 | A | * | 10/1992 | Conway | E03B 7/10 137/296 |
| 6,761,183 | B1 | * | 7/2004 | Hoeptner, III | E03C 1/106 137/218 |
| 7,654,280 | B2 | * | 2/2010 | Wu | E03B 7/10 137/301 |
| 8,402,991 | B2 | * | 3/2013 | Wu | E03B 7/12 137/301 |
| 8,613,290 | B1 | * | 12/2013 | Wu | F16K 3/08 137/218 |
| 9,249,561 | B2 | * | 2/2016 | Wu | E03B 9/027 |
| 9,540,797 | B2 | * | 1/2017 | Wu | E03B 7/12 |
| 9,670,651 | B1 | * | 6/2017 | Wu | E03B 7/12 |
| 2011/0114865 | A1 | * | 5/2011 | Wu | F16K 3/08 251/321 |
| 2013/0312845 | A1 | * | 11/2013 | Wu | E03B 9/027 137/218 |

* cited by examiner

*Primary Examiner* — Atif Chaudry
*Assistant Examiner* — Kevin Barss
(74) *Attorney, Agent, or Firm* — Alan D. Kamrath; Kamrath IP Lawfirm, P.A.

(57) ABSTRACT

An anti-freeze faucet contains: a first pipe, a second pipe, a check valve, and a control valve. The first pipe includes a hollow portion, an orifice, an outlet, and an inflow segment having two inlets. The second inserts into the hollow portion and includes a first connection segment, a second connection segment, and an air conduit, wherein the first connection segment has an air hole. The check valve is accommodated in the inflow segment and corresponding to the two inlets. The control valve is housed in the hollow portion and includes a base, a fitting bushing, and a coupling holder, wherein the base has two channels, and between the base and the fitting bushing is defined an accommodation chamber, the coupling holder has a rotation disc with a cold-water vent and a hot-water vent, and the coupling holder has multiple first openings and multiple second openings.

10 Claims, 11 Drawing Sheets

ANTI-FREEZE FAUCET

BACKGROUND OF THE INVENTION

Field of the Invention

The present invention relates to an anti-freeze faucet which is capable of supplying cold water solely or supplying a mixing water of the cold water and hot water.

Description of the Prior Art

A conventional anti-freeze faucet prevents remained water from freezing therein in chilly temperature, and it has a control valve in a threaded rotating type or in a ceramics type. When the control valve is in the threaded rotating type, the anti-freeze faucet is produced at low fabrication cost and can only supply cold water or hot water. When the control valve is in the ceramics type, the anti-freeze faucet can supply a mixing water of the cold water and the hot water.

Nevertheless, the anti-freeze faucet contains a first ceramics sheet and a second ceramics sheet, wherein the first ceramics has a first through orifice, and the second ceramics has a second though orifice, such that the first through orifice of the first ceramics sheet aligns with the second through orifice of the second ceramics sheet so that the cold water and the hot water mix together and flow out of an outlet of the anti-freeze faucet, after flowing through the first through orifice and the second through orifice. Thereafter, when the first through orifice of the first ceramics sheet does not align with the second through orifice of the second ceramics sheet, the cold water and the hot water are stopped by the first ceramics sheet and the second ceramics sheet, thus closing the cold water and the hot water. The anti-freeze faucet (having the first ceramics sheet and the second ceramics sheet) is complicated and is produced at high cost.

The present invention has arisen to mitigate and/or obviate the afore-described disadvantages.

SUMMARY OF THE INVENTION

The primary objective of the present invention is to provide an anti-freeze faucet which is capable of supplying cold water solely or supplying a mixing water of the cold water and hot watery.

Another objective of the present invention is to provide an anti-freeze faucet which is simplified and is produced at low fabrication cost.

An anti-freeze faucet provided by the present invention contains: a first pipe, a second pipe, a check valve, and a control valve.

The first pipe is hollow and includes a hollow portion defined in the first pipe, an orifice formed on a first end of the first pipe, an outlet arranged on a second end of the first pipe adjacent to the orifice, and an inflow segment arranged on a third end of the first pipe opposite to the first end of the first pipe. The inflow segment has two inlets, and the orifice, the outlet and the two inlets are in communication with the hollow portion.

The second pipe is hollow and inserts into the hollow portion of the first pipe, and the second pipe includes a first connection segment arranged on a first end of the second pipe, a second connection segment formed on a second end of the second pipe opposite to the first connection segment, and an air conduit defined between the first connection segment and the second connection segment. The first connection segment has an air hole communicates with the second connection segment via the air conduit.

The check valve is accommodated in the inflow segment of the first pipe and corresponds to the two inlets of the inflow segment, such that the check valve stops cold water and hot water flowing back to a cold-water source and a hot-water source via the two inlets.

The control valve is housed in the hollow portion of the first pipe and includes a base, a fitting bushing, and a coupling holder.

A first end of the base fits with the inflow portion of the first pipe, and the base has two channels defined on the first end thereof and communicating with the two inlets of the inflow segment of the first pipe via the check valve.

A second end of the base retains with the fitting bushing, and between the base and the fitting bushing is defined an accommodation chamber communicating with the two channels, wherein the coupling holder is rotatably inserted into of the fitting bushing, the coupling holder has a rotation disc housed in the accommodation chamber and contacting with each of the two channels, the rotation disc has two vents, and after the coupling holder is rotated, the two vents communicate with or do not communicate with the two channels.

A second end of the coupling holder connects with the second connection segment of the second pipe from the fitting bushing, and the coupling holder has multiple first openings and multiple second openings which are arranged on a peripheral wall of the coupling holder, wherein the multiple first openings are in communication with the multiple second openings and the accommodation chamber, and the multiple second openings communicate with the hollow portion of the body.

DETAILED DESCRIPTION OF THE PREFERRED EMBODIMENTS

Figure 1:
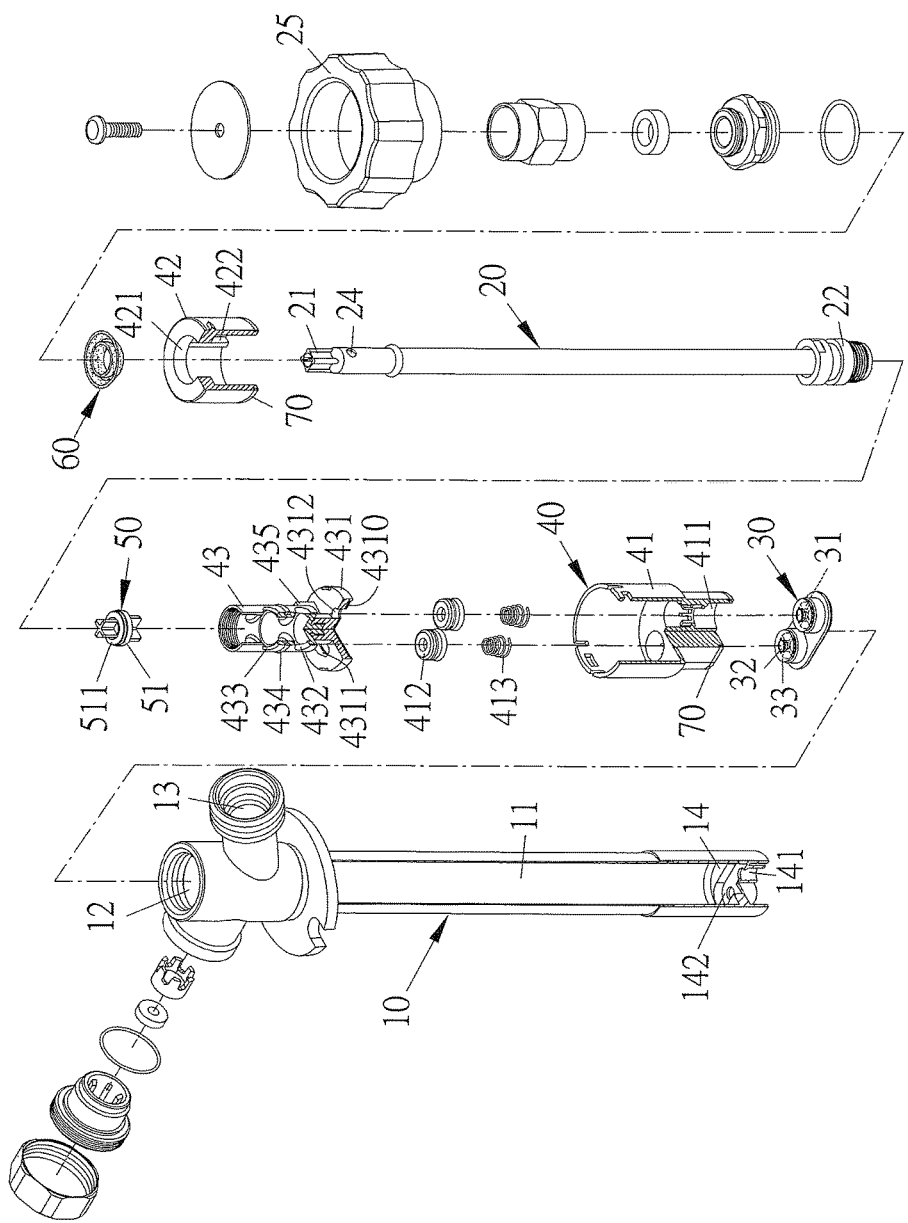
FIG. 1 is a cross-sectional perspective view showing the exploded components of an anti-freeze faucet in accordance with a preferred embodiment of the present invention.
Figure 2:
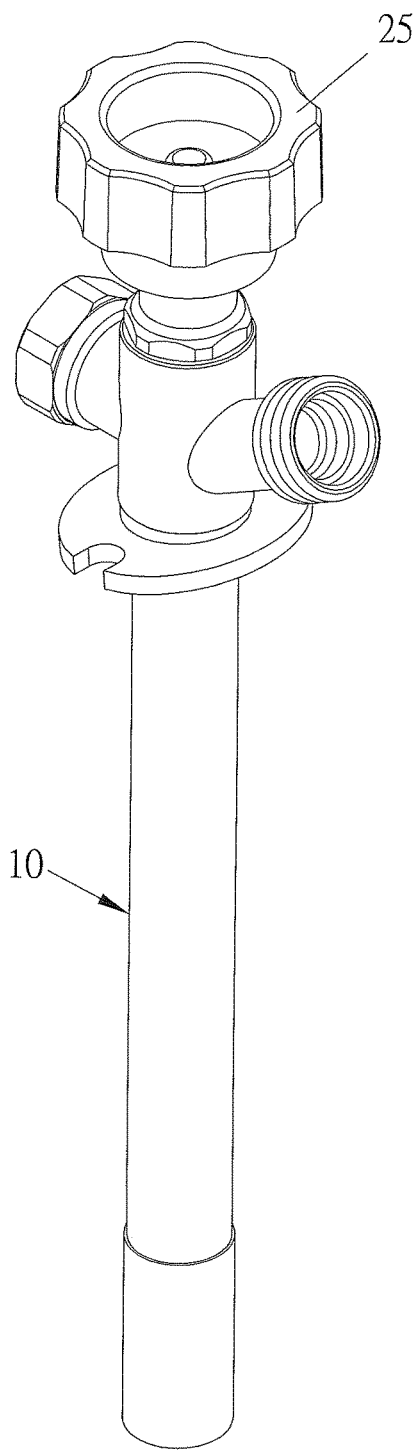
FIG. 2 is a perspective view showing the assembly of the anti-freeze faucet in accordance with the preferred embodiment of the present invention.
Figure 3:
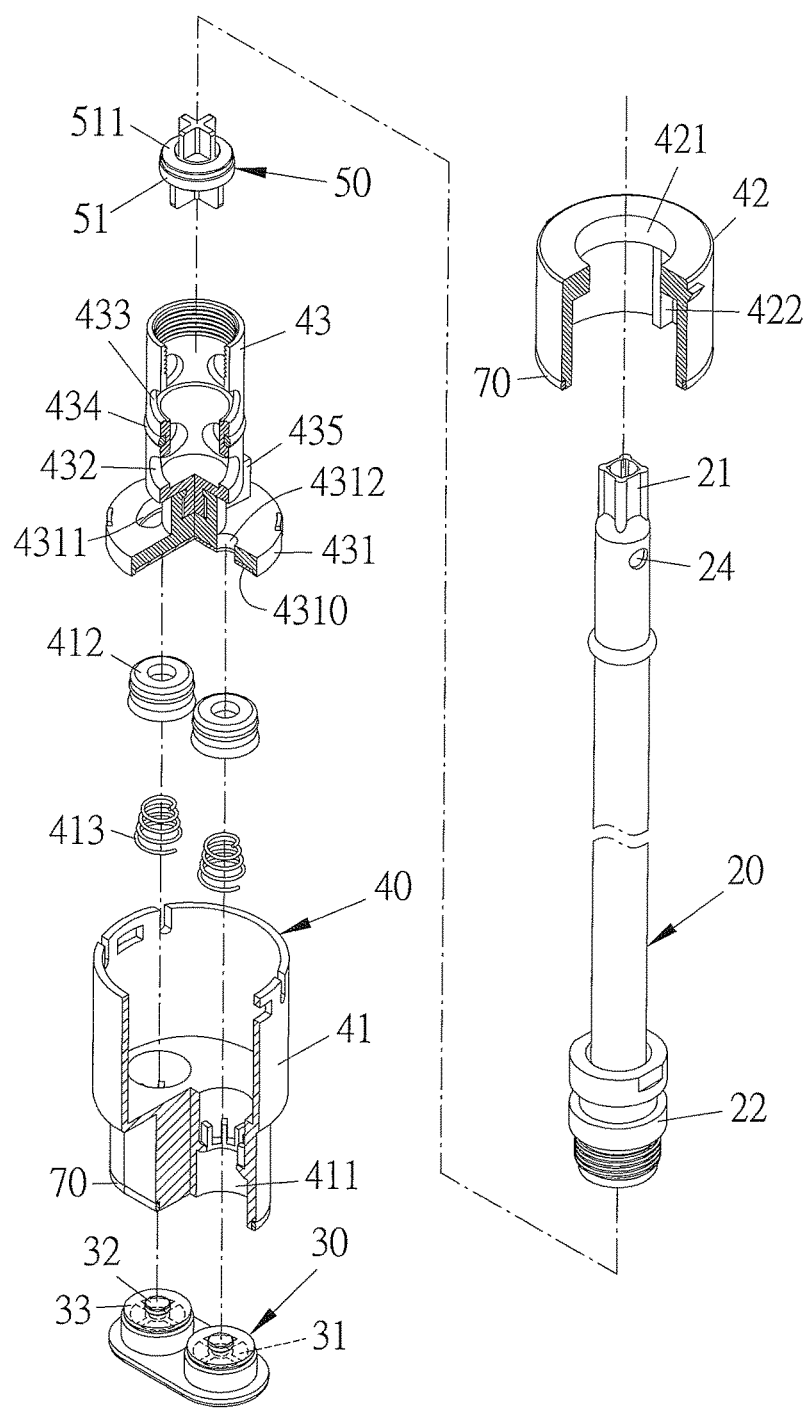
FIG. 3 is another cross-sectional perspective view showing the exploded components of the anti-freeze faucet in accordance with the preferred embodiment of the present invention.
Figure 4:
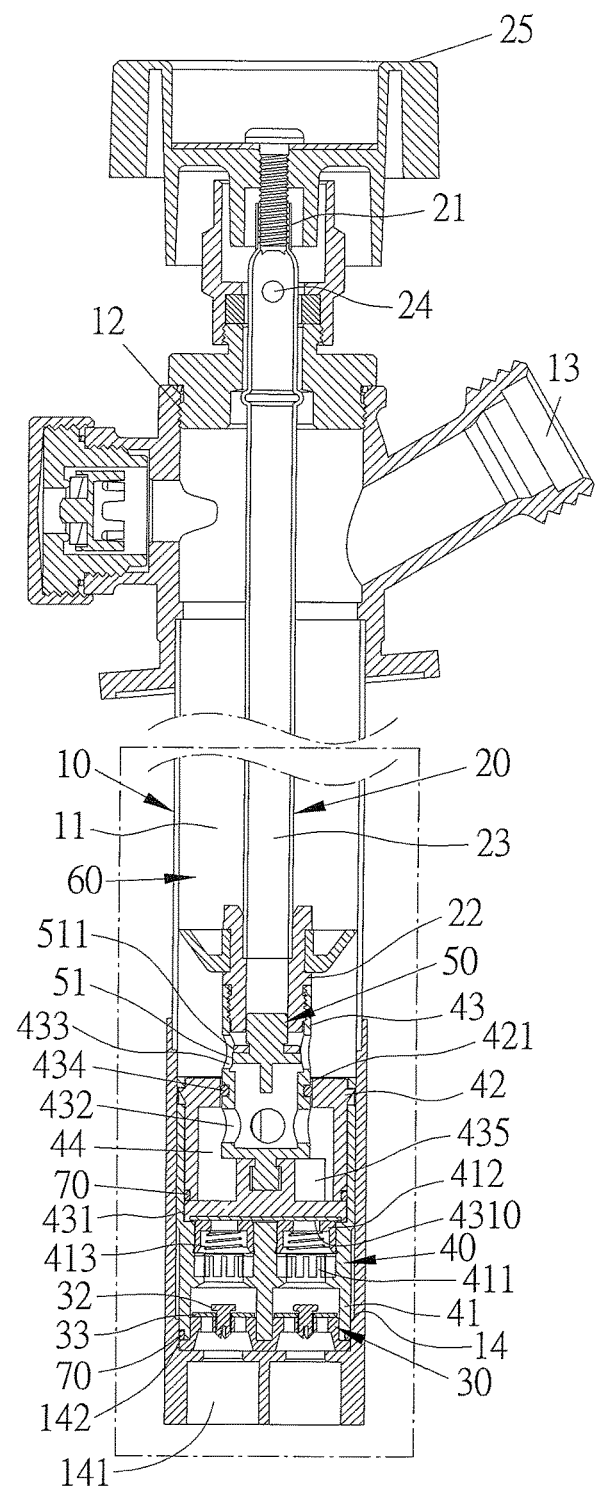
FIG. 4 is a cross sectional view showing the assembly of the anti-freeze faucet in accordance with the preferred embodiment of the present invention.
Figure 5:
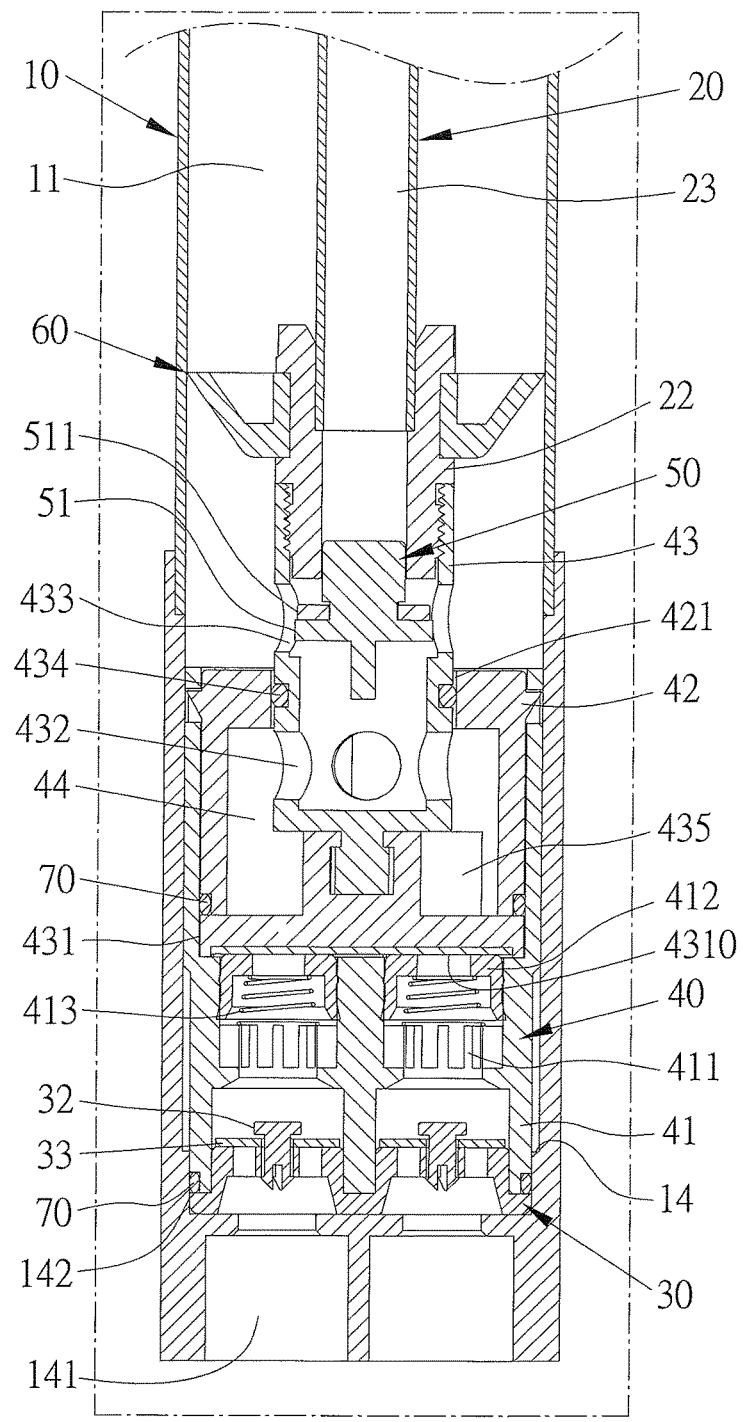
FIG. 5 is an amplified cross sectional view of a part of FIG. 4

The present invention will be clearer from the following description when viewed together with the accompanying drawings, which show, for purpose of illustrations only, the preferred embodiment in accordance with the present invention.

Referring to FIGS. 1-5, an anti-freeze faucet according to a preferred embodiment of the present invention comprises: a first pipe 10, a second pipe 20, a check valve 30, a control valve 40, a closing member 50, and a single-direction stop member 60.

The first pipe 10 is hollow and includes a hollow portion 11 defined in the first pipe 10, an orifice 12 formed on a first end of the first pipe 10, an outlet 13 arranged on a second end of the first pipe 10 adjacent to the orifice 12, and an inflow segment 14 arranged on a third end of the first pipe 10 opposite to the first end of the first pipe 10, wherein the inflow segment 14 has two inlets 141 connecting with a cold-water source and a hot-water source, respectively, and the orifice 12, the outlet 13 and the two inlets 141 are in communication with the hollow portion 11, the inflow segment 14 also has a positioning groove 142 formed therein facing the hollow segment 11 and corresponding to the two inlets 141.

The second pipe 20 is hollow and inserts into the hollow portion 11 of the first pipe 10, and the second pipe 20 includes a first connection segment 21 arranged on a first end of the second pipe 20, a second connection segment 22 formed on a second end of the second pipe 20 opposite to the first connection segment 21, and an air conduit 23 defined between the first connection segment 21 and the second connection segment 22, wherein the first connection segment 21 has an air hole 24 and a rotary knob 25, the air hole 24 communicates with the second connection segment 22 via the air conduit 23, and the rotary knob 25 is configured to drive the first pipe 20 to rotate.

The check valve 30 is accommodated in the positioning groove 142 of the inflow segment 14 of the first pipe 10 and corresponds to the two inlets 141 of the inflow segment 14, and the check valve 30 includes two flowing apertures 31 between which a fixing post 32 is fixed, wherein an area of the fixing post 32 is greater than each of two resilient pieces 33 in each of the two flowing apertures 31, such that the two resilient pieces 33 stop the two inlets 141 so that cold water and hot water cannot flow back to the cold-water source and the hot-water source via the two inlets 141.

The control valve 40 is housed in the hollow portion 11 of the first pipe 10 and includes a base 41, a fitting bushing 42, and a coupling holder 43, wherein a first end of the base 41 fits with the positioning groove 142 of the inflow portion 14 of the first pipe 10, and the base 41 has two channels 411 defined on the first end thereof and communicating with the two inlets 141 of the inflow segment 14 of the first pipe 10 via the check valve 30, and each of the two channels 411 accommodates a seal element 412 and a spring 413, wherein the seal sleeve 412 is flexible and hollow, and the seal sleeve 412 is pushed by the spring 413. A second end of the base 41 retains with the fitting bushing 42, and between the base 41 and the fitting bushing 42 is defined an accommodation chamber 44 communicating with the two channels 411, wherein the fitting bushing 42 has a through hole 421, and the coupling holder 43 is rotatably inserted into the through hole 421 of the fitting bushing 42, the coupling holder 43 has a rotation disc 431 housed in the accommodation chamber 44, and the rotation disc 431 has a flat face 4310 contacting with the seal sleeve 412 in said each channel 411 pushed by the spring 413 so as to stop the cold water and the hot water. Furthermore, the plane face 4310 of the rotation disc 431 has a cold-water vent 4311 and a hot-water vent 4312, and a length of the cold-water vent 4311 is greater than that of the hot-water vent 4312, hence after the coupling holder 43 is rotated, the cold-water vent 4311 and the hot-water vent 4312 communicate with or do not communicate with the two channels 411. A second end of the coupling holder 43 screws with the second connection segment 22 of the second pipe 20 from the through hole 421 of the fitting bushing 42 via the fitting bushing 42, and the coupling holder 43 has multiple first openings 432 and multiple second openings 433 which are arranged on a peripheral wall of the coupling holder 43, wherein the multiple first openings 432 are in communication with the multiple second openings 433 and the accommodation chamber 44, and the multiple second openings 433 communicate with the hollow portion 11 of the body 10. In addition, the coupling holder 43 includes a first stopping ring 434 fixed among the multiple first openings 432 and the multiple second openings 433, and the first stopping ring 434 is configured to matingly contact with the through hole 421 of the fitting bushing 42. The coupling holder 43 further includes a protrusion 435, and the fitting bushing 42 includes two shoulders 422 corresponding to the protrusion 435 of the coupling holder 43, such that the protrusion 435 and the two shoulders 422 limit a rotatable angle of the coupling holder 43.

The closing member 50 fits between the coupling holder 43 and the second connection segment 22 of the second pipe 20. The closing member 50 includes a circular close portion 51 which has a washer 511 facing the second connection segment 22 of the second pipe 20 so as to start or stop a communication between the air conduit 23 of the second pipe 20 and the multiple second openings 433 of the coupling holder 43.

The single-direction stop member 60 is connected with the outlet 13 of the first pipe 10 and the second pipe 20 among the multiple second openings 433 of the coupling holder 43, alternatively, the single-direction stop member 60 is coupled with the coupling holder 43. In this embodiment, the single-direction stop member 60 is connected with the second pipe 20 so that the hot water and the cold water or air only flow toward the outlet 13 of the first pipe 10.

One of two second stopping rings 70 is fixed between the base 41 and the inflow portion 14 of the first pipe 10, and the other of the two second stopping rings 70 is mounted between the base 41 and the fitting bushing 42.

Figure 6:
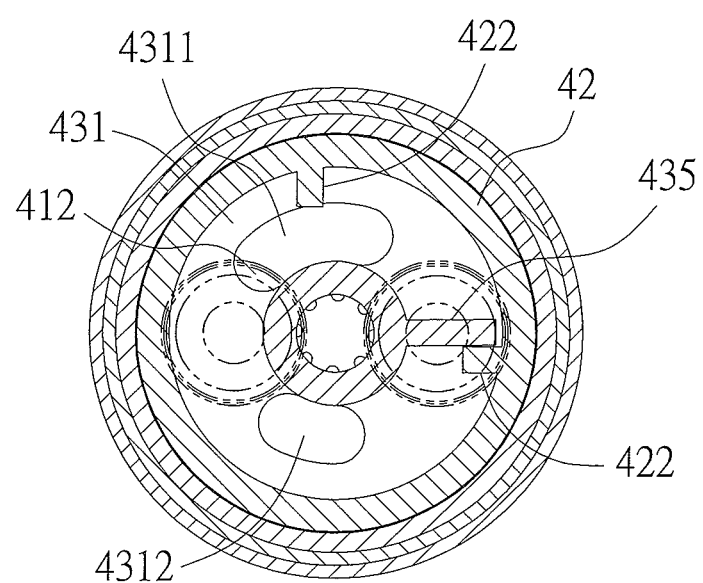
FIG. 6 is a cross sectional view showing the operation of the anti-freeze faucet in accordance with the preferred embodiment of the present invention.
Figure 7:
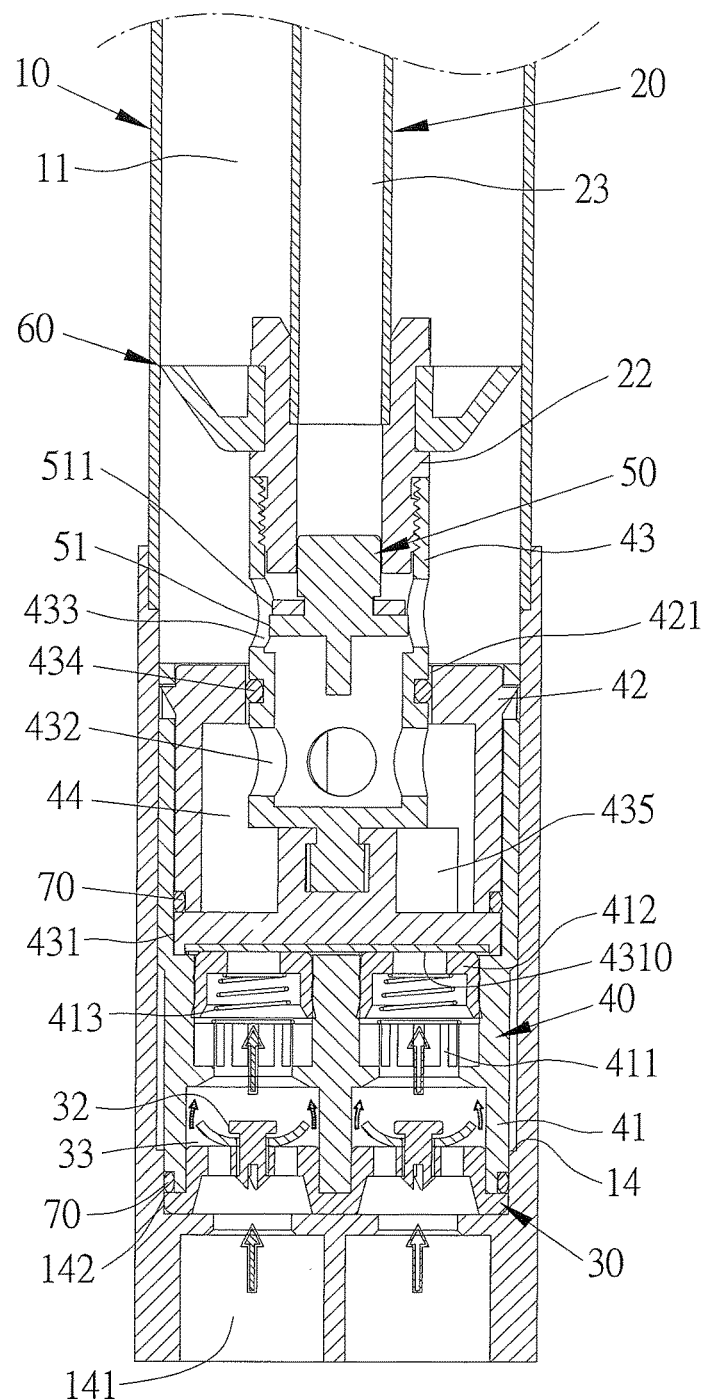
FIG. 7 is another cross sectional view showing the operation of the anti-freeze faucet in accordance with the preferred embodiment of the present invention.

Referring to FIGS. 6 and 7, as desiring to turn on the anti-freeze faucet, the rotary knob 25 is rotated so as to drive the coupling holder 43 to revolve toward a predetermined position, such that the cold-water vent 4311 and the hot-water vent 4312 of the coupling holder 43 do not communicate with the two channels 411 of the base 41, thus closing the anti-freeze faucet.

Figure 8:
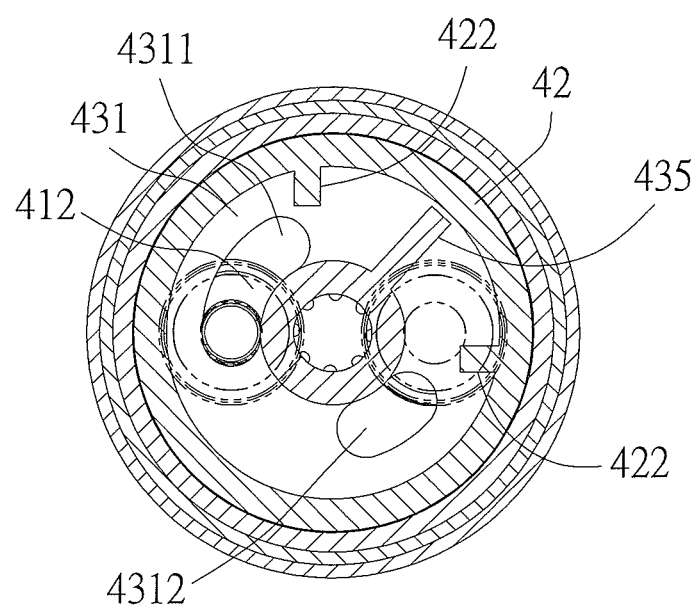
FIG. 8 is also another cross sectional view showing the operation of the anti-freeze faucet in accordance with the preferred embodiment of the present invention.
Figure 9:
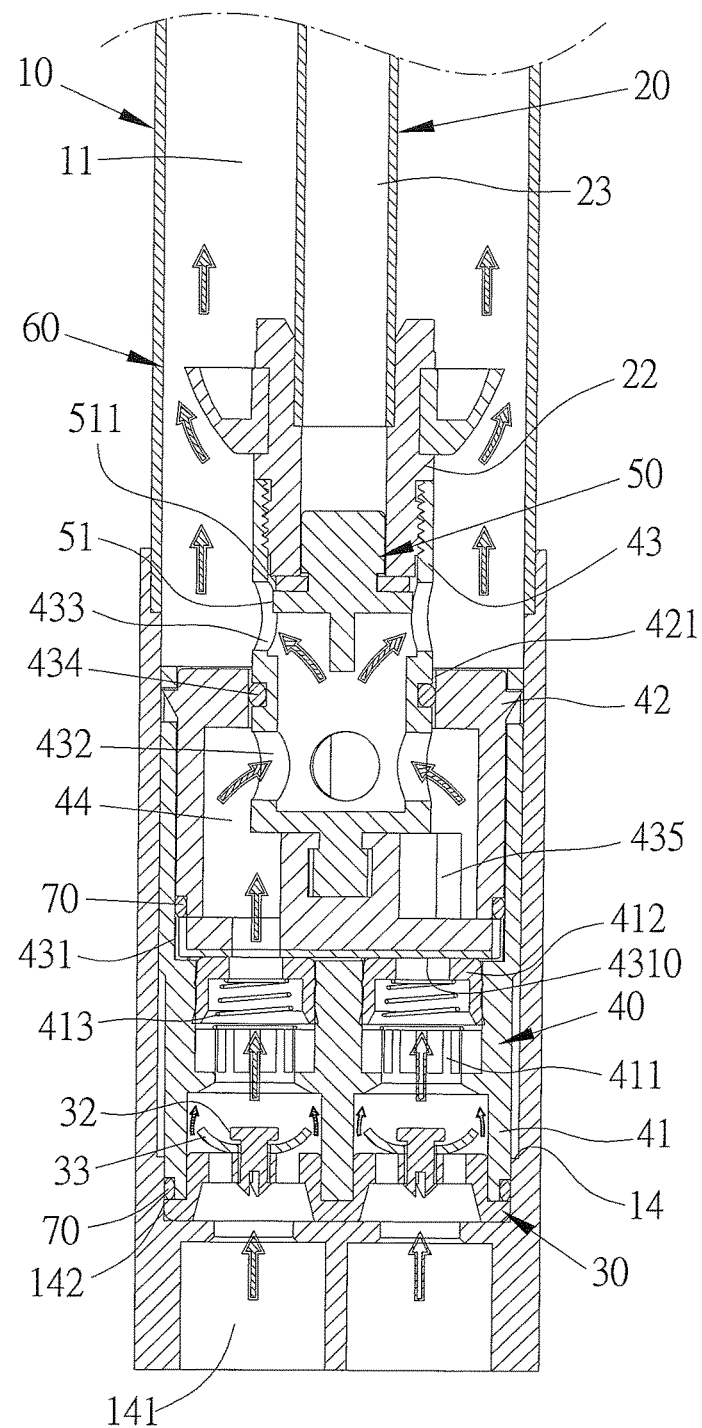
FIG. 9 is still another cross sectional view showing the operation of the anti-freeze faucet in accordance with the preferred embodiment of the present invention.

With reference to FIGS. 8 and 9, as desiring to flow the cold water out of the anti-freeze faucet, the rotary knob 25 drives the coupling holder 43 to revolve in certain distance so that the cold-water vent 4311 of the coupling holder 43 communicates with one of the two channels 411 of the base 41, and the hot-water vent 4312 of the coupling holder 43 do not communicate with the other of the two channels 411 of the base 41, hence the cold water flows into the accommodation chamber 44 between the base 41 and the fitting bushing 42 from the two inlets 141 of the inflow segment 14 of the first pipe 10 via the two flowing apertures 31 of the check valve 30, said one channel 411 of the base 41, and the cold-water vent 4311 of the coupling holder 43. Thereafter, the cold water flows into the coupling holder 43 from the multiple first openings 432 so that the closing member 50 is pushed by water pressure to move toward the second connection segment 22 of the second pipe 20, and the circular close portion 51 of the closing member 50 mates with the washer 511 so as to abut against the second connection segment 22 of the second pipe 20, and the air conduit 23 of the second pipe 20 communicates with the multiple second openings 433 of the coupling holder 43, such that the cold water flows out of the outlet 13 of the first pipe 10 from the multiple second openings 433 of the coupling holder 43 via the hollow portion 11 of the first pipe 10 and the single-direction stop member 60.

Figure 10:
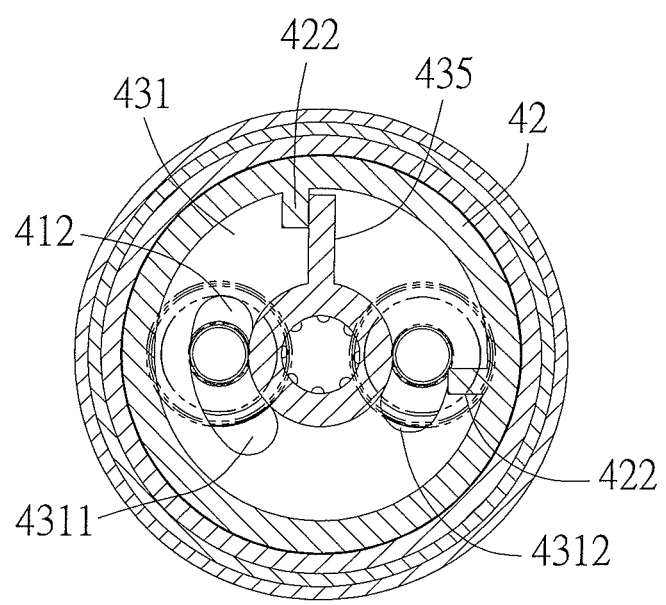
FIG. 10 is another cross sectional view showing the operation of the anti-freeze faucet in accordance with the preferred embodiment of the present invention.
Figure 11:
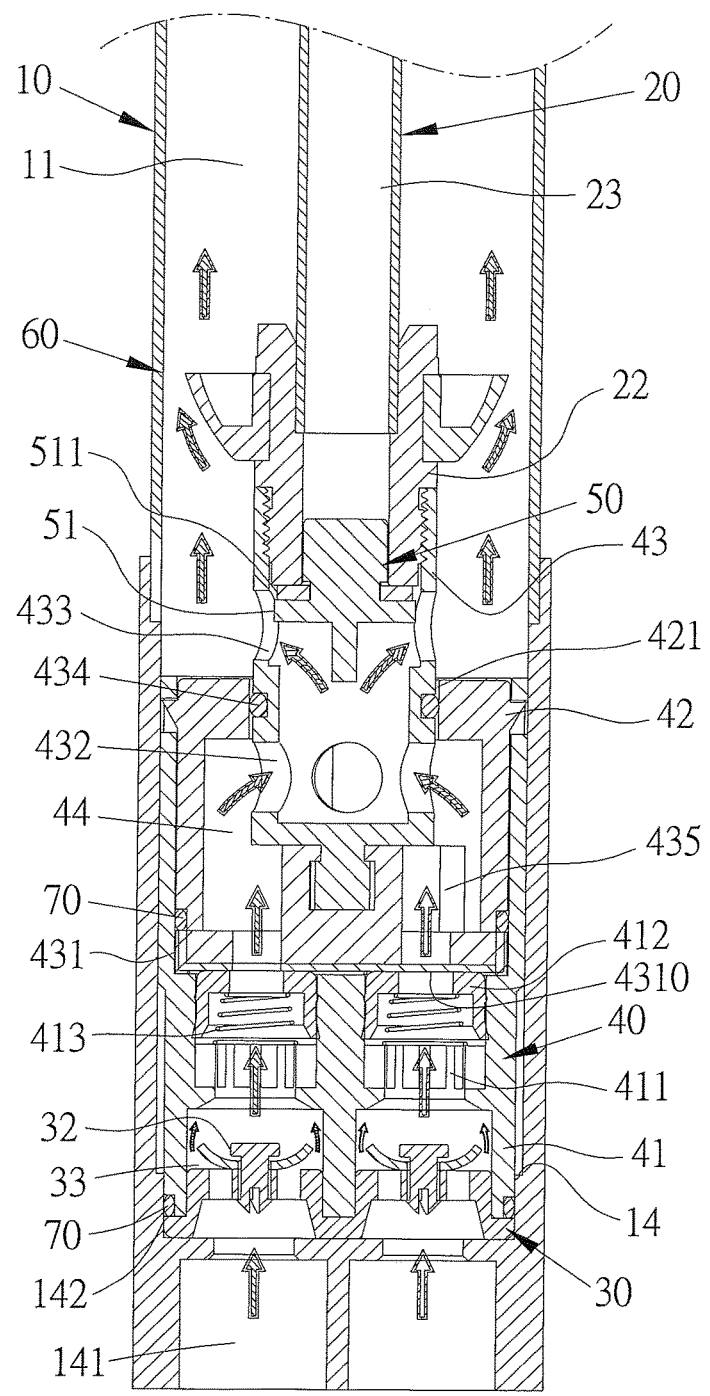
FIG. 11 is also another cross sectional view showing the operation of the anti-freeze faucet in accordance with the preferred embodiment of the present invention.

With reference to FIGS. 10 and 11, as desiring to flow a mixing water of the cold water and the hot water out of the anti-freeze faucet, the rotary knob 25 drives the coupling holder 43 to revolve through the second pipe 20 so that the cold-water vent 4311 of the coupling holder 43 communicates with the other of the two channels 411 of the base 41, and the hot-water vent 4312 of the coupling holder 43 communicates with the other of the two channels 411, hence the cold water and the hot water flow into the accommodation chamber 44 between the base 41 and the fitting bushing 42 from the two inlets 141 of the inflow segment 14 of the first pipe 10 via the two flowing apertures 31 of the check valve 30, said one channel 411 of the base 41, and the cold-water vent 4311 and the hot-water vent 4312 of the coupling holder 43. Thereafter, the cold water and the hot water flow into the coupling holder 43 from the multiple first openings 432 so that the closing member 50 is pushed by the water pressure to move toward the second connection segment 22 of the second pipe 20, the circular close portion 51 of the closing member 50 mates with the washer 511 so as to abut against the second connection segment 22 of the second pipe 20, and the air conduit 23 of the second pipe 20 communicates with the multiple second openings 433 of the coupling holder 43, such that the cold water and the holt water flow out of the outlet 13 of the first pipe 10 from the multiple second openings 433 of the coupling holder 43 via the hollow portion 11 of the first pipe 10 and the single-direction stop member 60.

Thereby, the anti-freeze faucet is capable of supplying the cold water solely or supplying the mixing water of the cold water and the hot water. Preferably, the anti-freeze faucet is simplified and is produced at low fabrication cost.

While we have shown and described various embodiments in accordance with the present invention, it is clear to those skilled in the art that further embodiments may be made without departing from the scope of the present invention.

What is claimed is:

1. An anti-freeze faucet comprising:
 a first pipe being hollow and including a hollow portion defined in the first pipe, an orifice formed on a first end of the first pipe, an outlet arranged on a second end of the first pipe adjacent to the orifice, and an inflow segment arranged on a third end of the first pipe opposite to the first end of the first pipe, the inflow segment having two inlets, and the orifice, the outlet and the two inlets being in communication with the hollow portion;
 a second pipe being hollow and inserting into the hollow portion of the first pipe, and the second pipe including a first connection segment arranged on a first end of the second pipe, a second connection segment formed on a second end of the second pipe opposite to the first connection segment, and an air conduit defined between the first connection segment and the second connection segment, the first connection segment having an air hole communicates with the second connection segment via the air conduit;
 a check valve accommodated in the inflow segment of the first pipe and corresponding to the two inlets of the inflow segment, such that the check valve stops cold water and hot water flowing back to a cold-water source and a hot-water source via the two inlets;
 a control valve housed in the hollow portion of the first pipe and including a base, a fitting bushing, and a coupling holder;
 wherein a first end of the base fits with the inflow portion of the first pipe, and the base has two channels defined on the first end thereof and communicating with the two inlets of the inflow segment of the first pipe via the check valve; and
 wherein a second end of the base retains with the fitting bushing, and between the base and the fitting bushing is defined an accommodation chamber communicating with the two channels, wherein the coupling holder is rotatably inserted into of the fitting bushing, the coupling holder has a rotation disc housed in the accommodation chamber and contacting with each of the two channels, the rotation disc has two vents, and after the coupling holder is rotated, the two vents communicate with or do not communicate with the two channels, a second end of the coupling holder connects with the second connection segment of the second pipe from the fitting bushing, and the coupling holder has multiple first openings and multiple second openings which are arranged on a peripheral wall of the coupling holder, wherein the multiple first openings are in communication with the multiple second openings and the accommodation chamber, and the multiple second openings communicate with the hollow portion of the body.

2. The anti-freeze faucet as claimed in claim 1, wherein the two inlets of the inflow segment connect with the cold-water source and the hot-water source, respectively, the two vents of the rotation disc are a cold-water vent and a hot-water vent, and a length of the cold-water vent is greater than that of the hot-water vent.

3. The anti-freeze faucet as claimed in claim 1, wherein the inflow segment of the first pipe also has a positioning groove formed therein facing the hollow segment and corresponding to the two inlets.

4. The anti-freeze faucet as claimed in claim 1, wherein the first connection segment of the second pipe has a rotary knob configured to drive the first pipe to rotate.

5. The anti-freeze faucet as claimed in claim 1, wherein the check valve includes two flowing apertures between which a fixing post is fixed, and an area of the fixing post is greater than each of two resilient pieces in each of the two flowing apertures.

6. The anti-freeze faucet as claimed in claim 1, wherein each of the two channels of the base accommodates a seal element and a spring, the seal sleeve is flexible and hollow, and the seal sleeve is pushed by the spring.

7. The anti-freeze faucet as claimed in claim 1, wherein the fitting bushing has a through hole, and the coupling holder is rotatably inserted into the through hole of the fitting bushing, the coupling holder includes a first stopping ring fixed among the multiple first openings and the multiple second openings, and the first stopping ring is configured to matingly contact with the through hole of the fitting bushing.

8. The anti-freeze faucet as claimed in claim 1, wherein the coupling holder further includes a protrusion, and the fitting bushing includes two shoulders corresponding to the protrusion of the coupling holder, such that the protrusion and the two shoulders limit a rotatable angle of the coupling holder.

9. The anti-freeze faucet as claimed in claim 1 further comprising a closing member fitting between the coupling holder and the second connection segment of the second pipe, wherein the closing member includes a circular close portion which has a washer facing the second connection segment of the second pipe so as to start or stop a communication between the air conduit of the second pipe and the multiple second openings of the coupling holder.

10. The anti-freeze faucet as claimed in claim 1 further comprising a single-direction stop member connected with the outlet of the first pipe and the second pipe among the multiple second openings of the coupling holder, alternatively, the single-direction stop member being coupled with the coupling holder so that the hot water and the cold water or air only flow toward the outlet of the first pipe.

* * * * *